United States Patent [19]
Lutsey

[11] 3,907,472
[45] Sept. 23, 1975

[54] MACHINE FOR MAKING SNOW CONES

[76] Inventor: Thomas H. Lutsey, P.O. Box 3157, Green Bay, Wis. 54303

[22] Filed: Sept. 5, 1973

[21] Appl. No.: 394,534

[52] U.S. Cl. ............................. 425/127; 425/126 R
[51] Int. Cl.² ........................................... A23G 9/22
[58] Field of Search ........ 425/126 R, 127, 257, 261, 425/360, 418, 423, 134, 347, 348

[56] References Cited
UNITED STATES PATENTS

| | | | |
|---|---|---|---|
| 2,767,664 | 10/1956 | Sedutto | 425/418 X |
| 2,850,990 | 9/1958 | Rasmusson | 425/257 |
| 2,899,915 | 8/1959 | Tomik | 425/112 |
| 2,963,738 | 12/1960 | Brandes et al. | 425/127 |
| 3,092,944 | 6/1963 | Wise | 53/276 |
| 3,126,841 | 3/1964 | Nay | 425/126 |
| 3,580,188 | 5/1971 | Lutsey | 425/118 X |

Primary Examiner—Francis S. Husar
Assistant Examiner—David S. Safran
Attorney, Agent, or Firm—Andrus, Sceales, Starke & Sawall

[57] ABSTRACT

Successive trays of cones are conveyed intermittently in stepped relation from a loading zone through a filling zone, a forming zone and a flavoring zone to an unloading zone. Successive forming bars are carried by an endless conveyor moved in synchronism with the tray conveyor to provide a vertical head for each cone in the filling zone. The cones are filled with snow in the loading zone and tamped to remove air pockets therefrom. The forming bars are cam lifted vertically from the filled cone as the same moves from the loading zone, thereby leaving a formed head of snow on each cone. A forming cap is applied to the head on the cone to shape it in the forming zone. The cap is rotated in one direction as it forms the head and reverse rotated as it is removed vertically from the cone. A lost motion weight carried by the cap retains the cone from lifting as the cap moves upwardly therefrom.

21 Claims, 11 Drawing Figures

MACHINE FOR MAKING SNOW CONES

BACKGROUND OF THE INVENTION

This invention relates to a machine for making snow cones and the like.

Most of the machines heretofore employed for this purpose have not been adaptable to large volume production with the attendant low cost per cone.

U.S. Pat. No. 3,126,841 is representative of the more recent art and in it single cones are filled and capped successively with a time requiring a complete cycle of operation for each before the next cone starts. The patent requires two attendants for the machine, thus pointing to an operation too costly for the present day market. Furthermore, the machine of the patent requires manual measurement of a quantity of snow to be loaded into each cone, a slow and tedious process.

Such manually actuated machines are ill adapted to produce thousands of snow cones per hour, as demanded by the current market.

SUMMARY OF THE INVENTION

The machine of the present invention is automatic and is adapted with only a single attendant to produce several thousand snow cones per hour.

According to the invention, empty cones are arranged in trays presenting successive tiers of cones conveyed in step by step intermittent movement from a loading station through a filling zone, a forming zone and a flavoring zone to an unloading station.

At the several stations of the filling zone the cones of successive tiers are partially filled, then tamped, and further filled with the head extensions or riser thereon deposited and formed to a generally frusto-conical shape.

For this purpose a separate endless conveyor carries successive forming bars, each adapted to register with the cones of a tier and to provide frusto-conical hopper-like recesses above the corresponding cones to accommodate and generally shape the riser of snow on the cone.

The successive forming bars move in synchronism with the corresponding cones through the filling zone and are gradually lifted therefrom by a cam controlled vertical movement followed by a tilting action to clear the corresponding cone risers as the latter move away from the filling zone.

At the forming zone a capping die is applied to the riser material on the cone to round the same to a generally semi-spherical shape, and then lifted upwardly to clear the cone for conveyor movement.

For the purpose of holding the cone against possible lifting by the die a weight is carried by the die to rest upon the rim of the cone and to be lifted therefrom by a lost motion connection with the die following upward removal of the die therefrom.

Means are provided to impart a limited rotational movement to each die as it is removed from its cone top to assist in effecting a release of the formed riser from the die.

The trays are filled and formed cones next pass through a flavoring or coating zone where each cone top or crown is impregnated with one or more colored flavoring constituents, after which the trays pass to the unloading station.

BRIEF DESCRIPTION OF THE DRAWINGS

The accompanying drawings illustrate an embodiment of the invention which constitutes the best mode presently contemplated for carrying out the invention.

In the drawings.

DESCRIPTION OF THE PREFERRED EMBODIMENT

Figure 1:
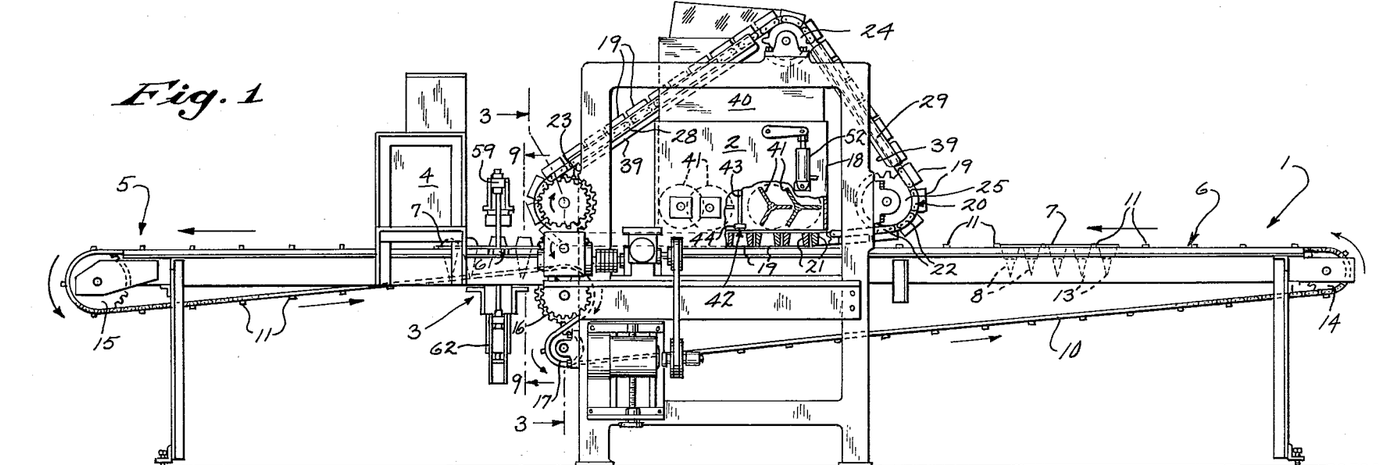
FIG. 1 is a side elevation of the machine with parts broken away and sectioned to illustrate details.
Figure 2:
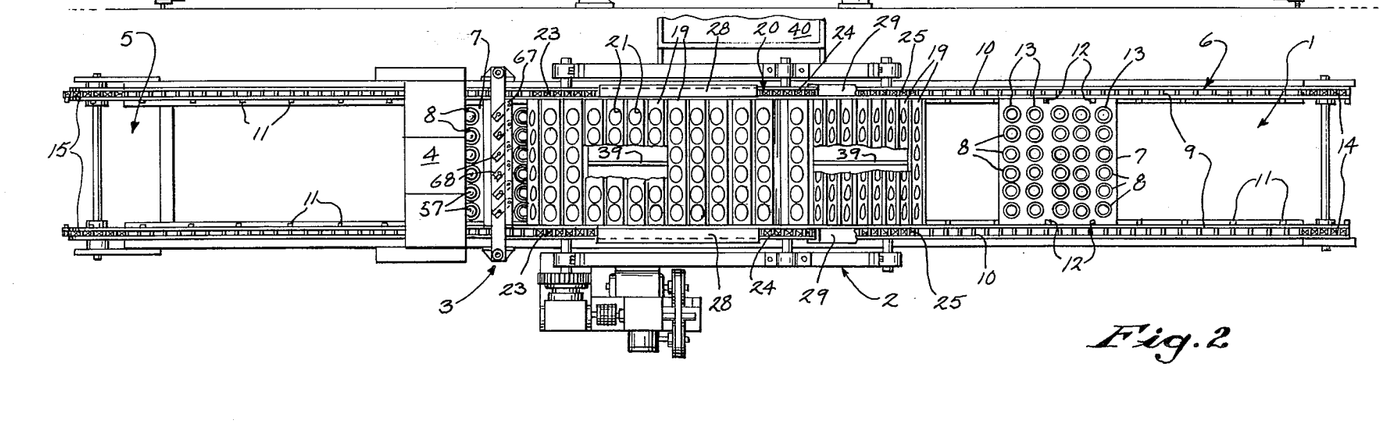
FIG. 2 is a top plan view of the machine of FIG. 1 with parts broken away and sectioned.
Figure 3:
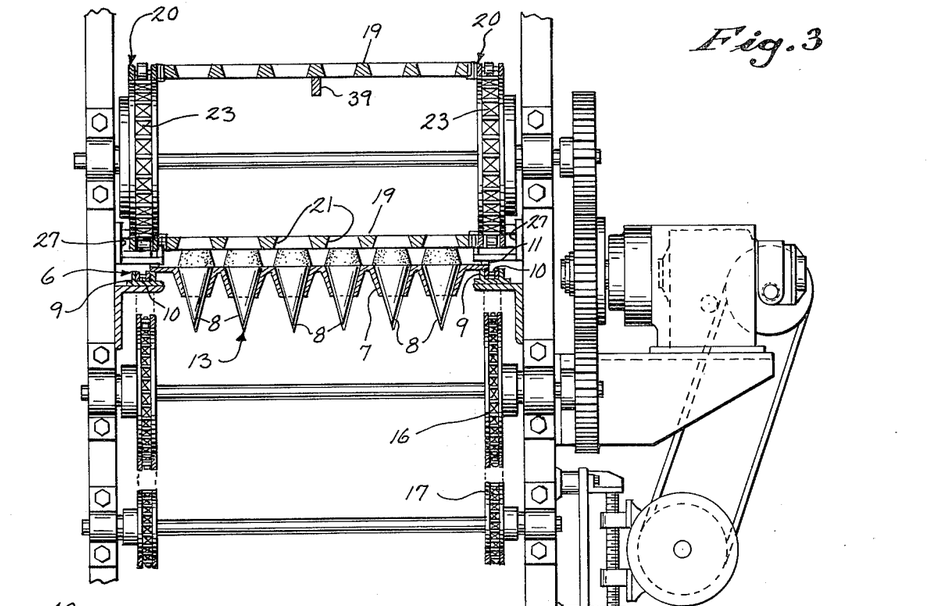
FIG. 3 is an enlarged vertical transverse section taken on line 3—3 of FIG. 1.
Figure 4:
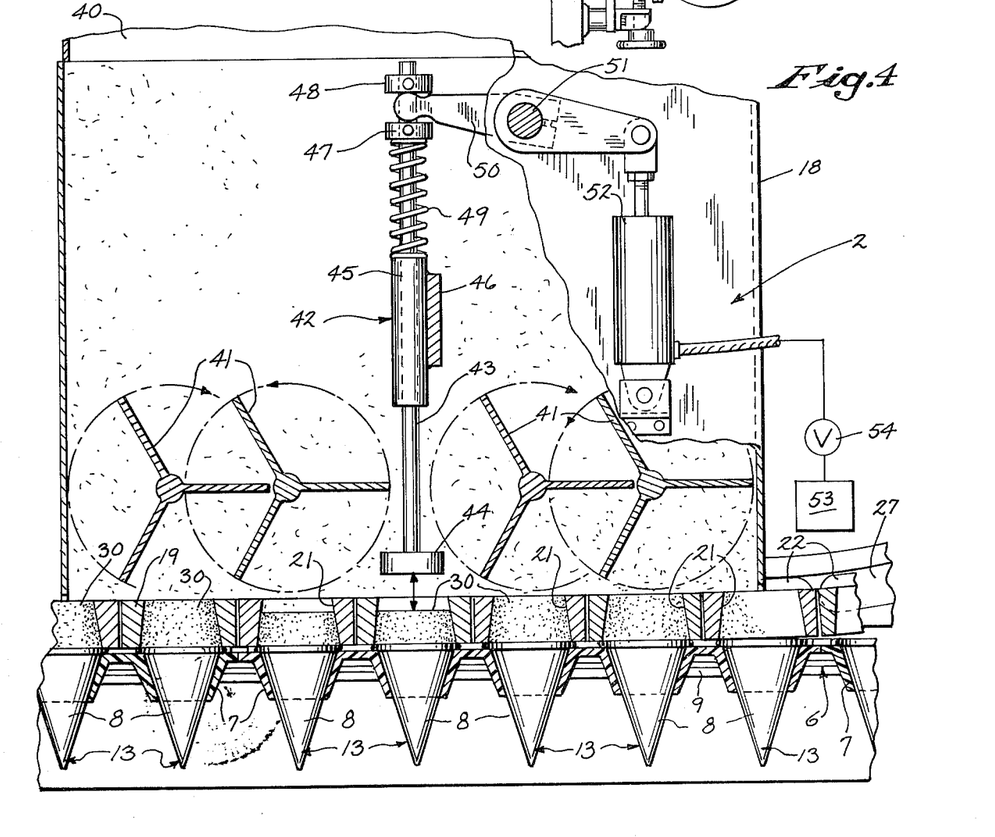
FIG. 4 is an enlarged detail view showing the successive steps in the filling zone and actuation of the tamper.
Figure 5:
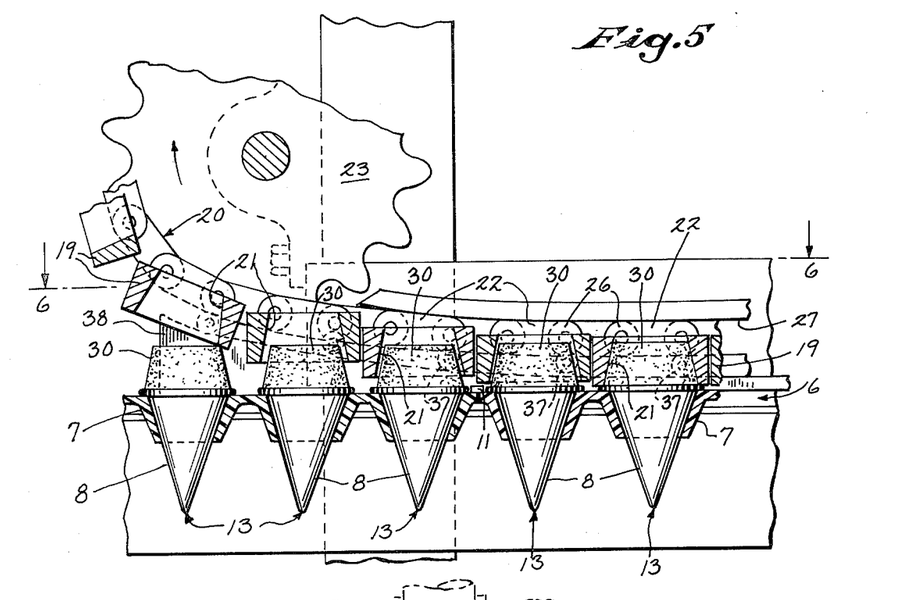
FIG. 5 is an enlarged detail view showing the lift-off mechanism for the forming bars and their removal from the cones.
Figure 6:
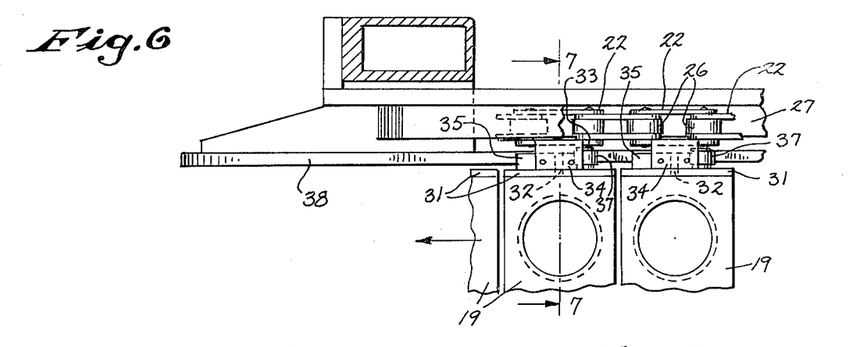
FIG. 6 is a plan view of a portion of the detail of FIG. 5.
Figure 7:
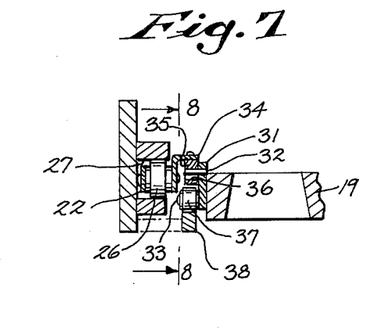
FIG. 7 is a detail section taken on line 7—7 of FIG. 6.
Figure 8:
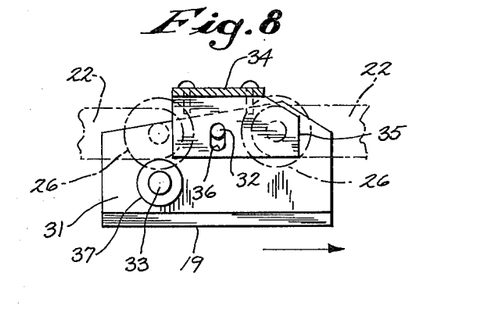
FIG. 8 is an enlarged detail section taken on line 8—8 of FIG. 7.
Figure 9:
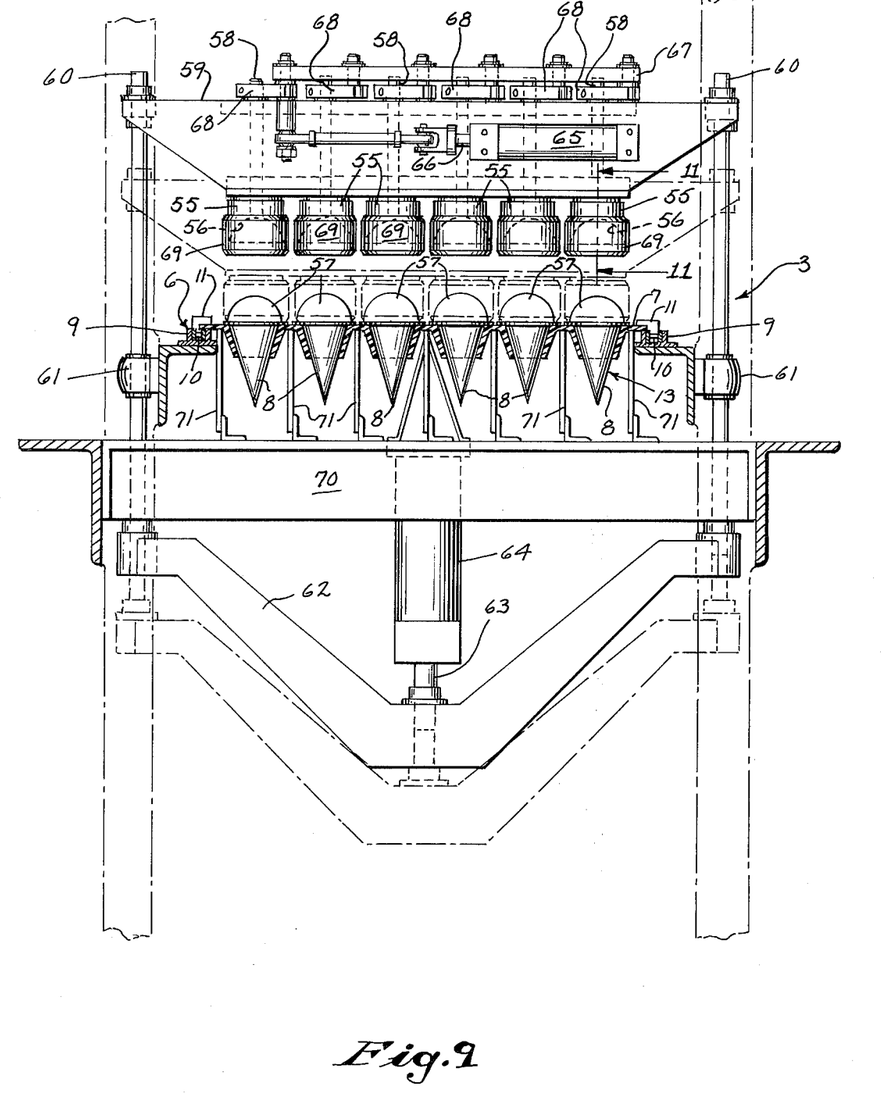
FIG. 9 is an enlarged transverse section on line 9—9 of FIG. 1 showing the capping dies and their mounting.
Figure 10:
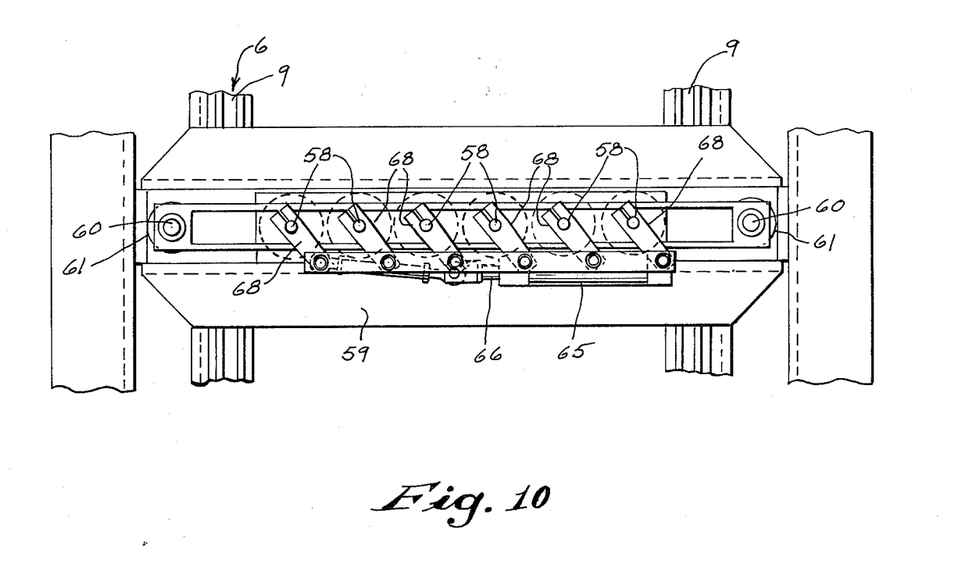
FIG. 10 is a top plan view of the mechanism of FIG. 9 showing the mechanism for rotating the capping dies.
Figure 11:
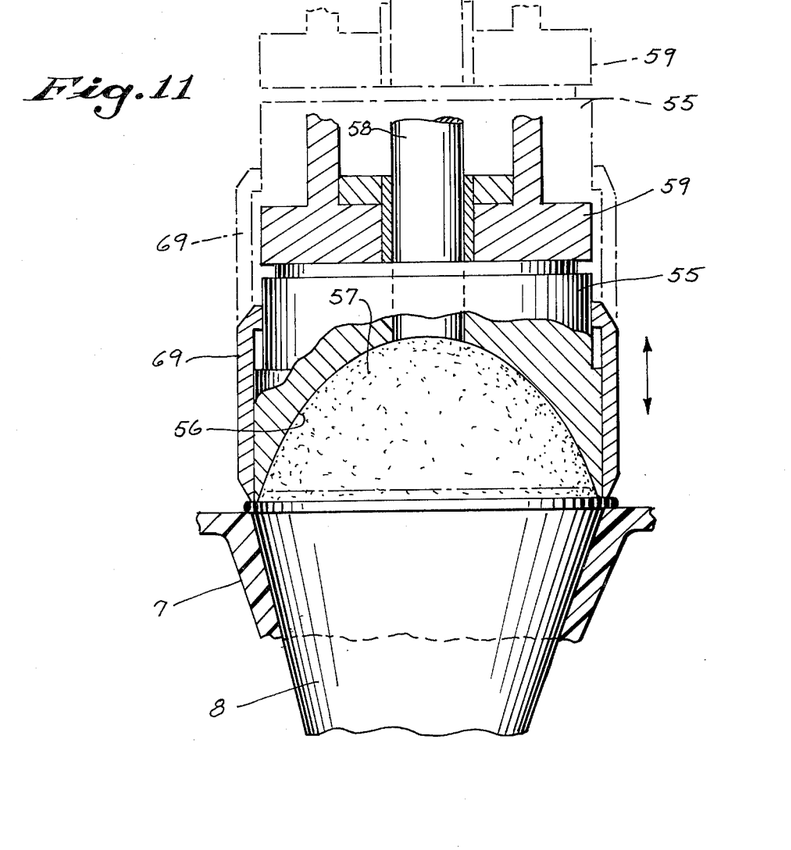
FIG. 11 is an enlarged axial section of a capping die showing the weight carried thereby and the lost motion connection therebetween.

The machine of the invention, as illustrated in the drawings, comprises in general a loading station 1, a filling zone 2, a forming zone 3, a flavoring or coating zone 4 and an unloading station 5.

A single conveyor 6 carries successive trays 7 of cones 8 from loading station 1 to unloading station 5.

The conveyor 6 is horizontal and comprises two laterally spaced parallel tracks 9 upon which the successive trays 7 rest and slide in movement therealong.

Each track is of upwardly facing channel construction in which an endless conveyor chain 10 rides.

Each conveyor chain 10 has a series of longitudinally spaced pusher lugs 11 thereon which are adapted to engage in corresponding recesses 12 in the edge of the trays 7 so that the latter are pushed along the tracks 9 by chain 10.

In the construction illustrated, each tray 7 is adapted to carry 30 cones 8 in transverse tiers 13 of six cones, each, the length of a tier representing the spacing between tracks 9.

The cone cups 8 may be as much as 3 inches in diameter and 3 inches in depth to the apex, or they may have a less depth with a flat bottom as desired.

The conveyor chain 10 is endless and passes over end idler sprockets 14 and 15 at the opposite ends of track 9 one of which may be adjustable to provide the desired tightness to the chain.

The lower course of chain 10 passes over a drive sprocket 16 and an idler sprocket 17 to effect the desired intermittent drive and dwell periods, whereby a tier 13 of cones is moved forward in successive steps corresponding to the centerline distance between successive tiers from station to station from the loading station 1 to the discharge station 5.

As the tray 7 of cones 8 leaves the loading station 1, it enters the filling zone 2 where the cones are filled with snow.

The filling zone 2 comprises a rectangular shaped housing 18 constituting a hopper open at the bottom which is closed by a series of abutting forming bars 19 carried by a pair of spaced endless chains 20.

Each forming bar 19 extends laterally across the width of a tray 7 and is of substantial thickness with individual frusto-conical vertical openings 21 therethrough adapted to register with the corresponding open tops of the cone cups 8 of a tier 13.

Each chain 20 is made up of a series of pivotally connected links 22 passing around a drive sprocket 23 at the discharge side of housing 18, thence upwardly on a reverse angle over housing 18 to an idler sprocket 24, thence downwardly on the opposite side of housing 18 to another idler sprocket 25 at the inlet side of housing 18.

The sprockets 23 and 25 are generally at the same level permitting bars 19 to be pressed downwardly upon the trays 7 as they move along together on conveyor 6 through the filling zone 2.

The pivotal connections for the links 22 have idler rollers 26 mounted thereon and which ride in a channel track 27 extending along the course of the chain between sprockets 25 and 23.

Similar tracks 28 and 29 support rollers 26 and guide the chain 20 in its course between sprockets 23 and 24 and between sprockets 24 and 25, respectively.

Drive sprockets 23 are connected to be driven by the same drive source as that for drive sprockets 16 so that the chains 20 and forming bars 19 thereon are driven in synchronism with chain 10 of conveyor 6 with successive forming bars 19 registering and moving with corresponding successive tiers 13 of cups 8 as the latter move along conveyor 6 through zone 2.

The openings 21 of bars 19 are slightly smaller in diameter than the open top of the cone cups 8 so that each bar presses down upon the rim of the cups for the tier 13 beneath and seals thereagainst, thereby providing a frusto-conical riser extension 30 for the cones at the top thereof.

Each bar 19 has an end plate 31 secured thereto at each end and each of which carries two fixed pins 32 and 33.

Pin 32 is disposed at the upper edge of bar 19 centrally thereof, and generally coincident with the centerline for the corresponding link 22 of chain 20 and equidistant from its end rollers 26.

The link 22 of chain 20 which faces the end of bar 19 has a horizontal flange 34 thereon which carries a block 35 adjacent to the outer face of plate 31.

Pin 32 rides in a vertically extending transverse slot 36 in block 35 to thereby retain each bar 19 in between corresponding links of the two side chains 20.

Pin 33 is disposed at the rear end of plate 31 having regard to the direction of travel of bar 19, and is generally coincident with the vertical centerline for the axis of the corresponding roller 26 of chain 20.

A cam roller 37 is rotatably mounted upon pin 33 to ride upon the upper edge of an upstanding cam plate 38 disposed in the region of desired lifting of the bars 19 from the cones 8.

For this purpose, as chains 20 approach the drive sprocket 23 in the discharge region of filling zone 2, the channel tracks 27 gradually incline upwardly, thus lifting pins 32 of a bar 19 and with them the bar.

In order to maintain the bar 19 level as it lifts from the cones 8, the cams 38 cause rollers 37 to raise the rear edge of the bar at the same rate as pin 32 lifts the bar.

Tracks 27 end just before chains 20 reach the sprockets 23 and the chains continue around the sprocket carrying the bars with them.

The cam 38 terminates after the bar 19 clears the risers 30 on the cones beneath.

The upper sprocket 24, above housing 18, lifts the bars 19 over and clear of the housing on their return path to the right hand end of zone 2.

In order to prevent the bars 19 from interlocking on their course between sprockets 23 and 24, and between sprockets 24 and 25 a Nylon strip 39 is disposed beneath them and supports them in a common plane.

The housing 18 is supplied with snow from an ice shaver 40 connected to one side of housing 18.

The snow in housing 18 is agitated by suitable vane rotors 41 operative just above the top surface of bars 19 and which tend to push snow downwardly into openings 21 from which the snow falls into the corresponding cone cups 8.

The rotors 41 may be driven constantly by any suitable drive means, not shown.

There are five stations in housing 18 at each of which a bar 19 and its tier 13 of cones dwell in their movement along conveyor 6. Two rotors 41 operate above the first two stations and two rotors 41 operate above the last two stations.

The central station in housing 18 provides a space in which a tamper 42 operates to squeeze air from the snow in cup 8.

The tamper 42 for each cone comprises a vertical reciprocal rod 43 having a flat head 44 at its lower end which is adapted to be moved downwardly through opening 21 into the corresponding cone cup 8 to semi-compress the snow therein and eliminate any air pockets therein.

The several rods 43 for the cones 8 of a tier 13 are carried by fixed guide sleeves 45 mounted on a cross bar 46 in housing 18.

Two vertically spaced discs 47 and 48 are mounted on the upper end of each of the rods 43.

Actuation of rods 43 is effected upwardly by a spring 49 coiled upon each rod between the top of the fixed guide sleeve 45 therefor and the disc 47 near the upper end of the rod.

Actuation of each rod 43 is effected downwardly by a rocker arm 50 having its head disposed between discs 47 and 48 and carried by a cross shaft 51 mounted in housing 18 and actuated by a hydraulic cylinder and piston device 52 on the outside of the housing.

Suitable connections of cylinder device 52 to a source 53 of hydraulic pressure, and a control valve 54 therefor is operated automatically from the main drive means previously referred to, in timed sequence with conveyor 6.

After tamper 42 has functioned, the tier 13 and its corresponding bar 19 are moved on to the next two stations in succession where further snow is added to that already in the cones 8 and filling the openings 21 to provide the frusto-conical risers 30 on the cones.

After the tier 13 with the cones filled with snow leave the housing 18, the bar thereon is gradually lifted bodily from the tier until it finally tilts away from the tier, as previously described.

Thereafter the tier 13 enters the forming zone 3 where riser 30 of each cone is formed into a generally hemispherical shape.

For this purpose, a downwardly facing die cap 55 with a hemispherical die cavity 56 is moved downwardly upon each riser 30 with a rotational twisting motion, and then is lifted upwardly with a reverse twist movement to release the snow therefrom and leave the top of the snow forming a crown 57 for the cone as shown.

The six die caps 55, operative simultaneously to form the crowns 57 upon a single tier 13 of cones 8, are suspended by rods 58 from a cross head 59 which in turn is carried upon vertically reciprocal end posts 60.

Posts 60 operate in sleeve guide bearings 61 and are supported by a beam 62 secured centrally to the lower end of a vertically mounted piston rod 63 of a hydraulic power cylinder 64 beneath conveyor 6.

Operation of cylinder 64 in timed sequence with the dwell of a tier 13 of cones at the forming zone 3 effects the controlled lowering and raising of caps 55.

Rotation of caps 55 is effected by a hydraulic power cylinder 65 on the side of cross head 59, and which has a piston rod 66 linked to the end of a reciprocal bar 67 to which the outer ends of a series of parallel cranks 68 are pivotally connected.

The inner end of each crank 68 is secured to the upper end of a corresponding rod 58.

Reciprocation of bar 67 in either direction by cylinder 65 will effect corresponding rotation of the rods 58 and their depending caps 55.

Actuation of cylinder 65 in synchronism with actuation of cylinder 64 effects the desired rotation of caps 55 as they move into and out of arrangement with the snow on the cones.

As an additional precaution to prevent accidental sticking of the crown 57 to cap 55 with an attendant lifting of the cone from tray 7, a weight in the form of a lead sleeve 69 encircles each cap 55 and is provided to engage the rim of the corresponding cone cup 8 and hold it down as the cap 55 lifts from the cone.

Sleeve 69 is carried by cap 55 with a lost motion connection therebetween whereby inter-engaging flanges of the two provide for a limited relative axial movement therebetween.

In the raised position of caps 55 the sleeves 69 extend downwardly beyond the caps, and as the caps move downwardly the sleeves first engage and rest upon the rims of the cones. Further downward movement of caps 55 effects the crowning of the cones.

As the caps 55 lift upwardly the sleeves 69 continue to press downwardly upon the rims of the cones and hold them in place until the caps release the snow therein, after which continued upward movement of caps 55 causes the flanges to engage each other and effects lifting of sleeves 69 form the corresponding cones 8 after the caps have released the crowns 57.

The lost motion connection between sleeves 69 and caps 55 additionally provide freedom of relative rotation therebetween whereby partial rotation of the caps 55 is not imparted to the sleeves while they are in engagement with the rims of the cones 8.

In order to prevent yielding or excessive downward flexing of trays 7 under pressure from the capping or forming operation, a cross bar 70 extends across the machine beneath tracks 9 and is provided with upstanding posts 71 spaced to be engaged by and support the tray between each of the cones of a tier as the latter is positioned in the forming zone 3.

Upon crowning of the cones of a tier at forming zone 3, the cones pass next through a flavoring zone 4 wherein the crown is supplied with suitable coloring and flavoring constituents.

Then the tray 7 emerges to the unloading station 5, and the finished cones are removed, refrigerated and packaged for marketing.

Various modes of carrying out the invention are contemplated as being within the scope of the following claims particularly pointing out and distinctly claiming the subject matter which is regarded as the invention.

I claim:

1. A machine for making snow cones supplied in successive trays of transverse tiers, comprising a loading zone, a filling zone having bulk feeding means with individual riser producing cavity means, a riser forming zone, a flavoring zone and an unloading zone; a straight line conveyor intermittently moving successive trays of cones from said loading zone to said unloading zone through said filling, forming and flavoring zones, and means moving said cavity means in alignment with corresponding cones in said filling zone.

2. A machine for making snow cones comprising a loading zone, a filling zone, a forming zone, a flavoring zone and an unloading zone; and a conveyor intermittently moving successive trays of cones from said loading zone to said unloading zone through said filling, forming and flavoring zones, and in which said filling zone comprises an open bottom housing spaced above said conveyor and adapted to receive a quantity of snow therein for filling the cones as they pass therebeneath, and a series of substantially thick forming bars carried by a continuous endless chain having a course passing through said space beneath said housing in the direction of said conveyor and closing the bottom of the housing, said bars having vertical openings therein constituting the riser producing means adapted to register with the mouth of the corresponding cones and to move therewith through said filling zone.

3. The machine of claim 2 and means in said housing to guide the snow therein to fall through the openings in said bars into the corresponding cones.

4. The machine of claim 2 and means in said housing operative in synchronism with said conveyor movement to tamp the snow in the successive cones.

5. The machine of claim 4, and guide means for snow to enter the openings in said bars, and in which said tamping means is intermediate said guiding means to effect a primary filling of the cones prior to tamping and a secondary filling thereafter to provide a riser on the cones.

6. The machine of claim 2 in which the openings through said bars in effect increase the height of the cones to provide the formation of a riser thereon.

7. The machine of claim 6 in which the openings through said bars are frusto-conical to facilitate lifting of the bars from the cones upon completion of the filling operation.

8. The machine of claim 7 and means to gradually lift said bars in succession vertically from the corresponding cones and to thereafter tilt the bars away from the cones.

9. The machine of claim 2 and hold down means disposed to hold the bars down upon corresponding tiers of cones in said trays during movement and positioning of the cones in the filling zone.

10. The machine of claim 9 and means to gradually lift each bar from its tier of cones as the same leaves the filling zone, and means to maintain the bars level during lifting thereof and until they have substantially cleared the risers on the cones.

11. The machine of claim 10 in which said lift means comprises a drive sprocket disposed to raise the chain from the level of its path through the filling zone, and said last named means comprises a pivotal mounting for each bar upon the chain, and a cam controlling the orientation of the bar relative to the chain as the latter rises in its course.

12. The machine of claim 11 and means to maintain said bars oriented with respect to said chain in the return course of the latter.

13. The machine of claim 1 in which said forming zone comprises a cap for the corresponding cone of each tier and having a die cavity therein and adapted to move down upon and form riser snow on successive cones into a final shape, and means to move said caps simultaneously downwardly into contact with corresponding cones of a tier to compress the risers beneath the caps and thereafter to retract the caps therefrom.

14. The machine of claim 13 and means to partially rotate said cap as it engages and compresses the snow on the cone and to reverse the rotation of said cap as it lifts from the cone.

15. The machine of claim 13 and means operable in synchronism with said caps to support the tray against flexing under the downward pressure of said caps.

16. The machine of claim 13 and means mounted upon each of said caps and operable in response to movement thereof to hold down said cone as said cap is lifted therefrom.

17. The machine of claim 16 in which said last named means comprises a weight to engage the rim of each cone and having a lost motion connection with said cap whereby the corresponding weight is lifted from the cone by said cap after said cap has released the crown of snow formed thereby.

18. The machine of claim 17 and means to partially rotate each said cap as it moves downwardly in engagement with the snow on the cone and to reverse the rotation of said cap as it lifts from the cone, said weight being free to accommodate said rotation of the cap.

19. The machine of claim 13 in which the cones are arranged in cross tiers in said trays, and a cross head carrying a cap for each cone of a tier, said cap moving means comprising means to raise and lower said cross head; and means to support the tray against flexing under the downward forces of said caps.

20. The machine of claim 18 in which the cones are arranged in cross tiers in said trays, and a cross head carrying a cap for each cone of a tier, said cap moving means comprising means to raise and lower said cross head, and means to support the tray against flexing under the downward forces of said caps.

21. The machine of claim 2 in which cones are arranged in cross tiers in said trays and said bars are provided one for each tier of cones with vertical openings through the bars registering with corresponding cones of the tier.

* * * * *

UNITED STATES PATENT AND TRADEMARK OFFICE
CERTIFICATE OF CORRECTION

PATENT NO. : 3,907,472
DATED      : September 23, 1975
INVENTOR(S) : Thomas H. Lutsey It is certified that error appears in the above-identified patent and that said Letters Patent are hereby corrected as shown below:

Column 1, line 34, Delete "extensions" and substitute therefor --extension--

Column 5, line 39, Delete "arrangement" and substitute therefor --engagement--

Column 5, line 61, Delete "form" and substitute therefor --from--

Column 7, line 31, After "rotate" insert --each--

*Signed and Sealed this*

*tenth* Day of *February 1976*

[SEAL]

Attest:

RUTH C. MASON
*Attesting Officer*

C. MARSHALL DANN
*Commissioner of Patents and Trademarks*